United States Patent [19]

Smith

[11] 4,399,631

[45] Aug. 23, 1983

[54] FISHING ROD WITH BITE SIGNALING MEANS

[76] Inventor: Claude T. Smith, 625 Sylvan St. #2, Daly City, Calif. 94014

[21] Appl. No.: 248,955

[22] Filed: Mar. 30, 1981

[51] Int. Cl.³ .............................................. A01K 97/12
[52] U.S. Cl. ..................................................... 43/17
[58] Field of Search ...................................... 43/16, 17

[56] References Cited

U.S. PATENT DOCUMENTS 3,238,659  3/1963  Lamb ....................................... 43/17
4,051,616  10/1977  Mathauser .............................. 43/17

FOREIGN PATENT DOCUMENTS 1091037  4/1955  France ....................................... 43/17
493768  of 1954  Italy ......................................... 43/17

Primary Examiner—Nicholas P. Godici
Assistant Examiner—Marc Hodak
Attorney, Agent, or Firm—Robert Charles Hill

[57] ABSTRACT

A telescopic fishing rod having an inward end provided with a handgrip; a pressure responsive bendably resilient outward end portion; distributively positioned line guides; a parallel resilient or movable outward end portion with a line guide or eyelet; and a fishing line threaded through the respective eyelets from a suitable reel, the line being responsive to a downward pull caused by a nibble or bite to initiate an electronic signal by moving the parallel end portion of the rod. The handle is equipped with a signal device such as a visual light and/or audible electronic buzzer, and appropriate switches are provided to individually or simultaneously operate the signal device in response to the signal from the end portion of the rod.

3 Claims, 17 Drawing Figures

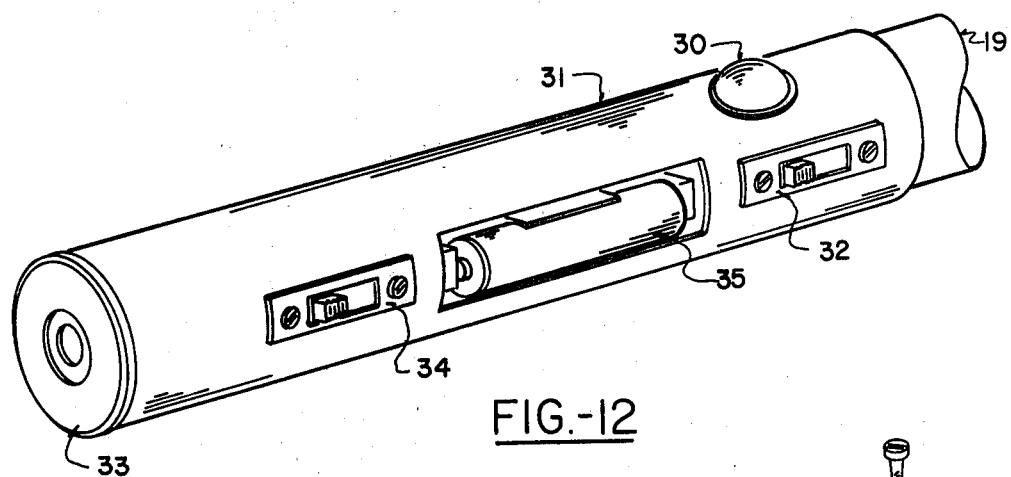
FIG.-12
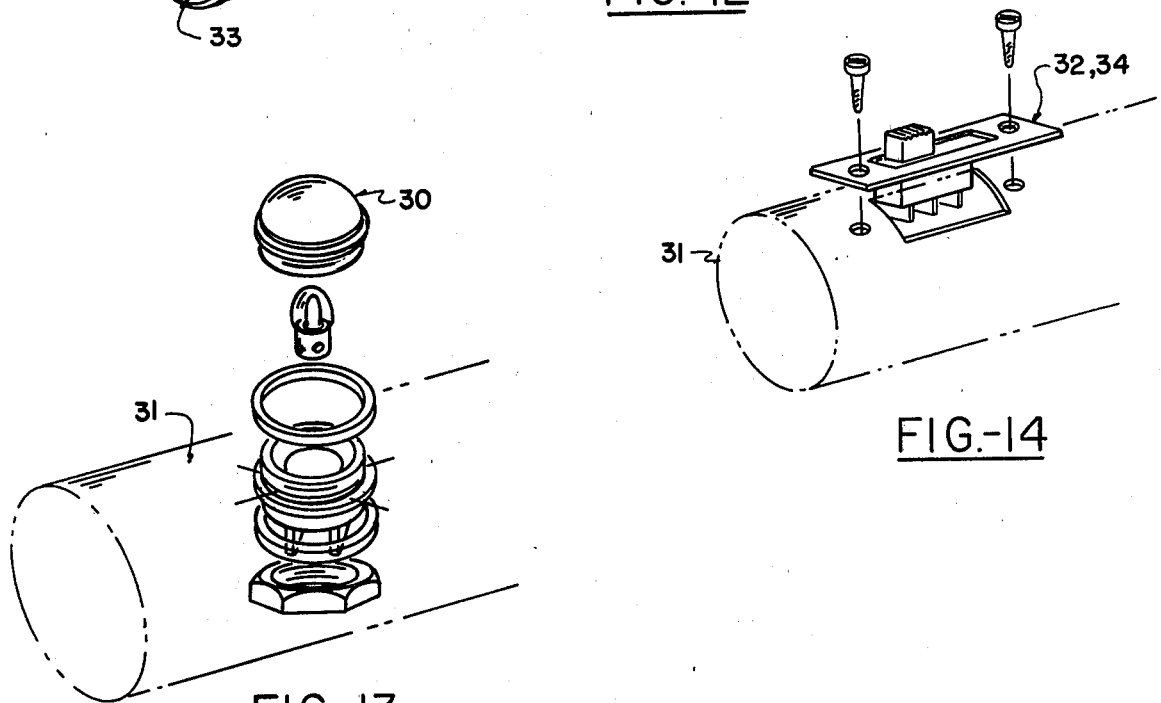
FIG.-13
FIG.-14
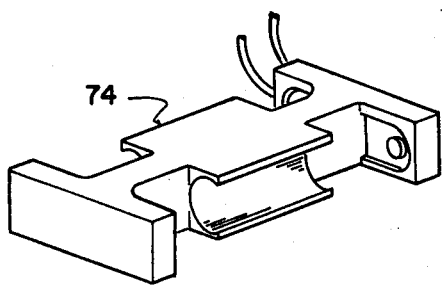
FIG.-15
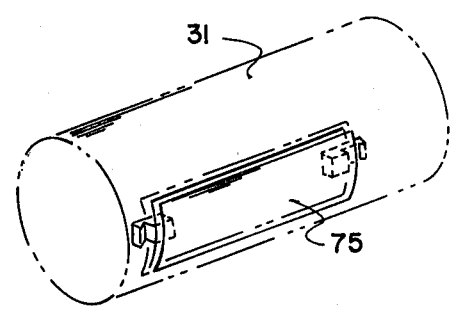
FIG.-16

FISHING ROD WITH BITE SIGNALLING MEANS

BACKGROUND OF THE INVENTION

The present invention relates to a fishing rod and more particularly to a fishing rod including an electronically actuated bite signalling device.

This invention sets a distinct and innovative precedent to previous visual and audible manufactured methods of alerting an angler to a nibbling or hooked fish. Although there has been many and structurally different bite signalling devices that have been devised and offered for use by those who have sought to improve or advance the field of angling, none has been revealed to have the characteristics exemplified in applicant's invention of being compact in design; accessible for use; adjustable to circumstances; durable in construction; effective in use; and requiring non-assemblage from the angler.

The applicant has taken into consideration in the construction of this invention the obscurity of vision during night fishing and have overcome this problem by providing a visual light installed in the handle which is operable by an on-off switch. Thus, requiring minimal operation to effective night fishing or fishing when vision is obscured.

There are many and varied circumstances or situations encountered by anglers in fishing, one being that of having vision obscured, thus requiring one to depend upon other senses to alert oneself to the nibbling or hooked fish. If these senses have not been refined through daily use, they cannot accurately be relied upon and can be deceiving. One such sense is that of touch. The mere holding of a rod becomes tiring and oftentimes ineffective as far as distinguishing from a real bite, snagged line, or water current.

SUMMARY OF THE INVENTION

An objective of this invention is to structurally, functionally and otherwise improve on prior art fishing rods and to provide anglers with a signalling device which is activated by a movable tip or end portion of the rod in response to a bite or nibble producing a downward pull on the line.

Another objective of this invention is to make the fishing rod itself readiliy accessible. The applicant has accomplished this through the use of a telescopic fishing rod which becomes compact and easy to carry when not in use and conventional structurally when in use.

The present invention meets these objectives and overcomes problems of the type set forth above in a number of ways: by installation of an electronic audible device when vision is obscured to the extent that it cannot be relied upon; installation of an adjustment to downward pull, installation of a circuit make-and-break that is electronically sensitive and is activated only through downward slanting action.

Another problem which many anglers encounter is that of assembly. An objective of this invention is to free the anglers from assemblage. Thus, the applicant has constructed the invention so that the electrical circuit is internal with minor exponent parts; having all attachments included in the structural design of the telescopic rod. The only requirements of the angler to effective fishing are threading the additional eyelet and flipping the desired on and off switch.

The general appearance of the said rod undertakes the facsimile of a regular sectional type fishing rod when extended to full length and is functional to the basic intent of a regular fishing rod.

The telescopic fishing rod is hollowed and contains internal electrical wires of both positive and negative polarity. These two wires extend the full internal length of the telescopic rod and the handle.

The handle of the rod is also hollowed and contains the main components to the electric circuit: energy source (batteries); on and off switches; visual light; and an audible electonic buzzer.

The audible electronic buzzer and the visual light may be either simultaneously or individually operable to alert the angler of a nibbling or hooked fish.

These together with other objectives and advantages which will become subsequently apparent reside in the details of construction and operation as more fully hereinafter described wherein like numerals refer to like parts throughout, and in which:

BRIEF DESCRIPTION OF THE DRAWINGS

FIG. 12 is a perspective view of the handle or butt.

FIG. 13 is an exploded view of the visual light system.

FIG. 14 is an exploded view of the on and off switches.

FIG. 15 is a perspective view of the battery holder.

FIG. 16 is a perspective view of the energy source cover.

DESCRIPTION OF THE PREFERRED EMBODIMENT

Figure 1:
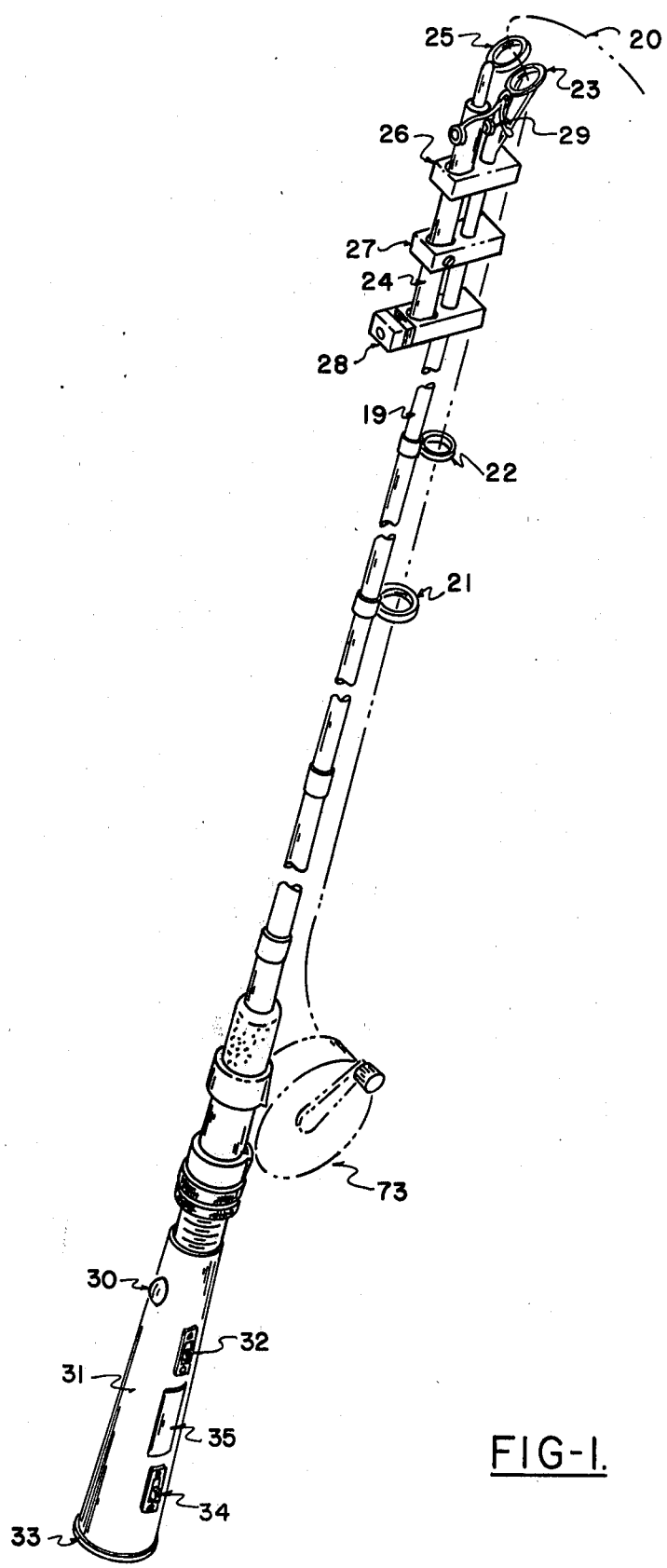
FIG. 1 is a perspective view of the external features of the entire extended telescopic rod with appropriate setup.

Referring to FIG. 1 of the drawings, there is shown the conventional telescopic rod in an extended ready-to-use position generally indicated 19 which is adjustable to a compact position when not in use by the angler. The telescopic rod 19 has attached thereto a reel 73 which contains a fishing line 20 which is threaded through the respective eyelets or line guides 21, 22 and 23.

Attached in a permanent position to the telescopic rod 19 and a part of the structural design of the tip end portion is a bendably resilient outward end portion which is a paralleled short electronically sensitive bendably resilient outward end portion 24 containing one eyelet 25. This eyelet is in the same plane as the other eyelets 21, 22 and 23 and is likewise threaded. The short rod 24 is supported and held in paralleled portion to the outward end portion of 19 by three boxes 26, 27 and 28.

Figure 17:
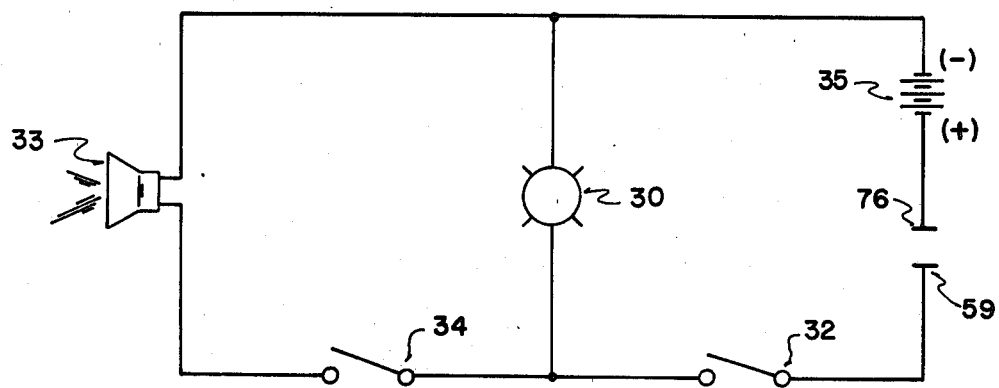
FIG. 17 is a schematic diagram of the electrical circuit located in the handle.

When the fishing line 20 is assigned weight either by the nibbling action or a hooked fish, the short rod 24 comes in electrical contact with the tip end of rod 19. This contact activates the make-and-break device 29 to close the internal circuit. As a result of the closed circuit, the visual light 30 found in the handle 31 illuminates when the switch 32 is in the on position. The switch 32 controls not only the visual light 30 but the entire electrical circuit (FIG. 17). Simultaneously the electronic audible buzzer 33 will sound if the switch 34 has been set to the on position. The switch 34 controls only the audible buzzer.

Figure 2:
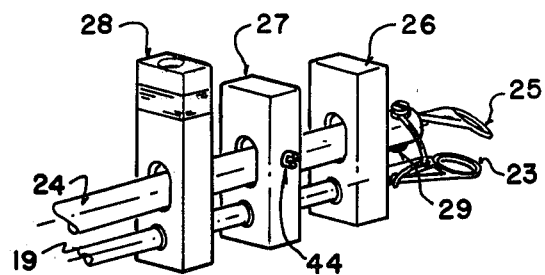
FIG. 2 is an enlarged perspective view of the pressure responsive bendably resilient outward end portions with support systems.

FIG. 2 is an illustrated version of the two rods outward end portions 19 and 24 stationary in paralleled position with their respective eyelets 23 and 25. These two rods are held in position by the three boxes 26, 27 and 28. FIGS. 3 through 7 are illustrated views of the individual boxes and their working counterparts.

Figure 3:
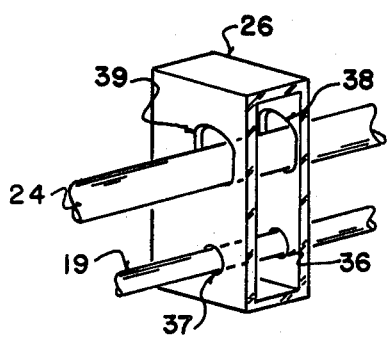
FIG. 3 is an enlarged perspective view of an individual support system.

FIG. 3 depicts the stationary and parallel positioning of the telescopic rod tip end portion 19 and the short rod 24. As illustrated in the drawings, rod 19 has its own private entrance 36 and exit 37 which are circular in design. A separate elliptical entrance 38 and exit 39 have been provided for rod 24. The elliptical entrance 38 and exit 39 allow for vertical movement of the rod 24.

Figure 4:
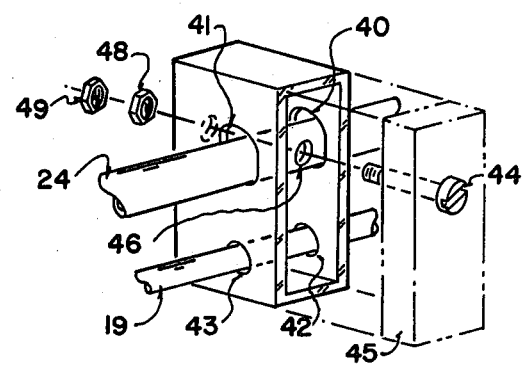
FIG. 4 is a developed perspective view of the middle support system and pivoting device.

FIG. 4 illustrates the inner workings of box 27. Again, an elliptical entrance 40 and exit 41 have been provided for rod 24. A separate circular entrance 42 and exit 43 have been provided for rod 19. This box, however, has a screw 44 that intercepts the front of the box 45 and rod 24 at point 46 and the back of the box 47 (FIG. 5), and is held in place by nut 48 and nut 49. A topside view of this interception is depicted through the illustrated FIG. 5. The screw 44 is a fulcrum for the rod 24. This fulcrum permits vertical movement of the rod 24. However, the degree of movement is dependent a great deal upon the tension applied.

Figures 5, 6:
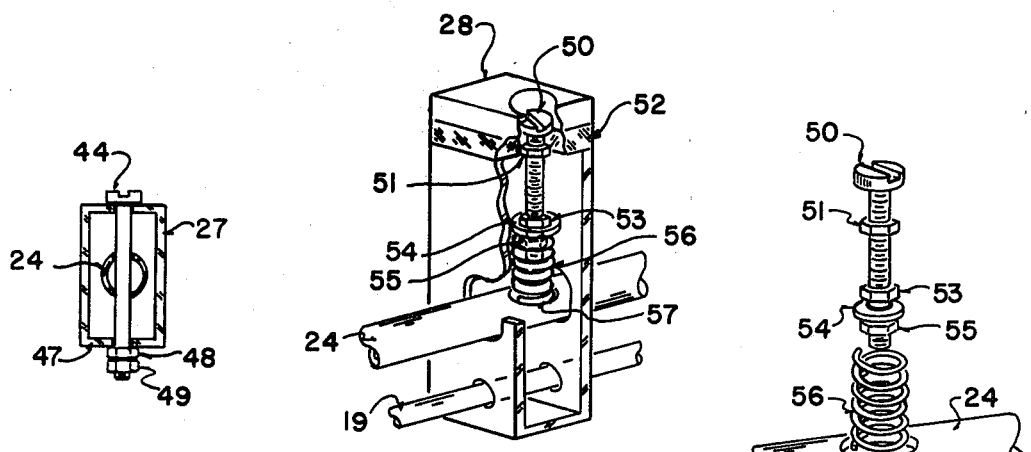
FIG. 5 is a top sectional view of the support system depicted in FIG. 4.
FIG. 6 is a perspective view partially broken away of the support system with tension adjustment device.

FIG. 6 is an illustrated view of box 28 and its component parts. Box 28 also provides an elliptical entrance and exit for rod 24 and a circular entrance and exit for rod 19. The screw 50 is used as an adjustment to the tension applied to the rod 24, thereby controlling the degree of vertical movement of rod 24 and the amount of effort necessary to close the electrical circuit in order to activate the visual light 30 or the audible buzzer 33. The screw 50 also serves simultaneously as an adjustment to water current.

The screw 50 is threaded through the nut 51 which has been embedded in insert 52 for stationary positioning of said screw 50, the nut 53, washer 54, and the nut 55. When the screw 50 is tightened, it applies downward and constant pressure on the washer 54. This pressure is then transmitted to the coils of the spring 56 which is positioned in a concave opening 57 of the rod 24. This pressure is then transferred to the rod 24, thus limiting the degree of vertical movement.

Untightening the screw 50 lessens the amount of pressure exerted on the spring 56 and rod 24, thus permitting increased vertical movement.

Figure 7:
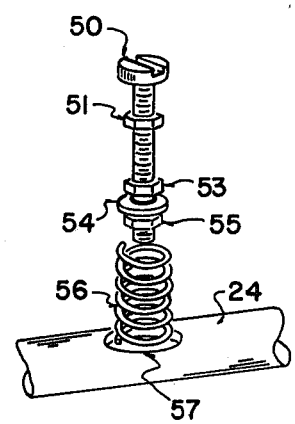
FIG. 7 is an exploded view of the tension adjustment and all its component parts.

A close-up view of the inner working parts to the adjustment for vertical movement is found in the illustrated drawing FIG. 7.

Figure 8:
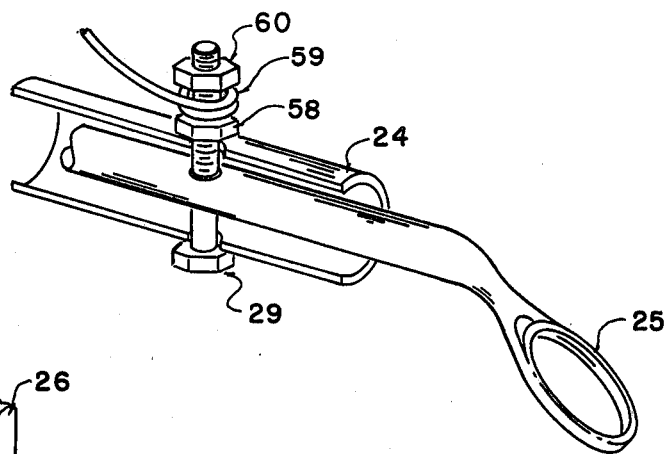
FIG. 8 is a perspective sectional view of the additional paralleled pressure responsive bendably resilient outward end portion with circuit make-and-break device.

Referring to FIG. 8 of the drawings, there is shown an isolated view of the parallel short electronically sensitive bendably resilient outward end portion 24. The short rod 24 is intercepted horizontally by the eyelet 25 and vertically by a single screw 29. The screw 29 is held stationary by the nuts 58 and 60. The positively charged wire 59 encircles the mid-section of the screw 29 and is permanently positioned between the nuts 58 and 60.

The head of the screw 29 serves as a closure to the internal open circuit of rod 19. When the head of the screw 29 contacts the metallic surface of rod 19, the circuit is closed, thus permitting the visual light 30 and the audible device 33 to be activated either individually or simultaneously (see FIG. 17).

Figure 9:
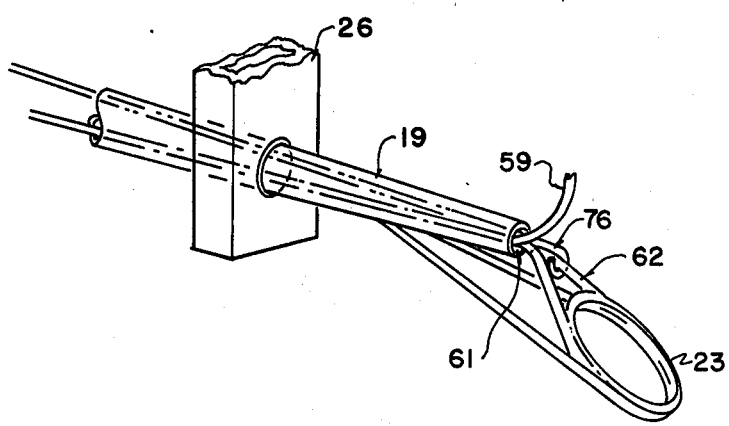
FIG. 9 is a perspective view of the main pressure responsive bendably resilient outward end portion known or referred to as the tip.

Referring now to FIG. 9 of the drawings, there is provided an illustration of the rod's tip end section. The electrical wires 59 and 76 exit the rod 19 at a small opening 61. A positively charged wire 59 crosses the ground negatively charged wire 76 and is anchored to the support beam 62 of the eyelet 23. The positively charged wire 59 encircles the screw 29 of the rod 24 (see FIG. 8).

Figure 10:
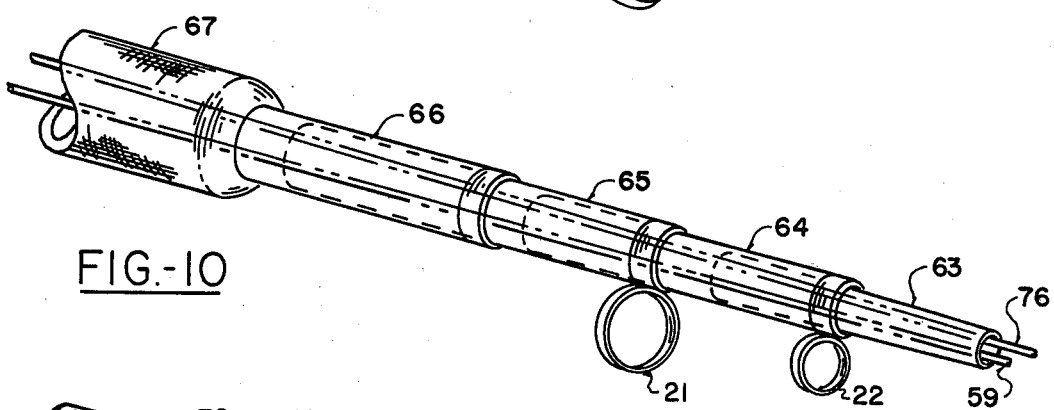
FIG. 10 is a perspective view of the mid-section; line guides, and electrical wiring of the telescopic rod.

FIG. 10 is an illustrated view of the telescopic rod 19, joints 63, 64, 65, 66 and 67. Each joint found in the telescopic rod is hollow, slightly narrower than the previous joint, tapered, and directly proportioned in length when extended to the other joints. Joint 63 fits loosely inside of joint 64, joint 64 fits loosely inside the joint 65 and joint 65 fits loosely inside of joint 66 when retracted, and the larger end of each joint fits snuggly at the mouth of the previous joint when extended. The joints 66 and 67 are non-retractable. Joint 67 is surfaced with a cork type material to provide an adequate handgrip of the telescopic rod.

The telescopic rod contains two additional eyelets or line guides 21 and 22.

The telescopic rod 19, along its entire internal length, contains two electrical wires of which 59 is a positively charged wire and 76 is a negatively charged wire (see FIGS. 8, 9 and 10).

Figure 11:
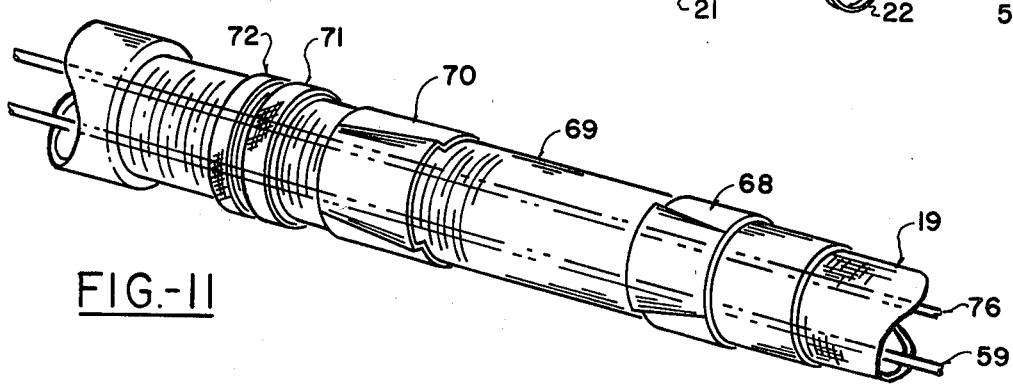
FIG. 11 is a perspective view of the metal reel seat and electrical wiring.

The metal reel seat 69 depicted in the illustrated drawing FIG. 11 is also hollow. The reel band 68 is stationary. The reel band 70 is adjustable to accommodate any size reel desired by the angler for either salt or fresh water fishing.

The lock rings 71 and 72 are used to lock the reel band 70 into the desired position to hold the reel 73 (see FIG. 1).

The wires 59 and 76 extend through the reel seat 69 and all its component parts.

The handle or butt 31 of the telescopic rod 19 is depicted in the illustrated drawing FIG. 12. The external features of the handle 31 include a visual light 30, on and off switch 32 for the light 30, audible buzzer 33, on and off switch 34 for the buzzer 33, and D.C. operated energy source 35 in the form of a battery.

An exploded view of a typical light system is depicted in the illustrated drawing of FIG. 13.

An exploded view of a typical on and off switch for use with 32 and 34 is depicted in the illustrated drawing of FIG. 14.

The batteries are contained in a battery holder 74 as depicted in the illustrated drawing of FIG. 15.

FIG. 16 depicts an illustrated version of a battery cover 75 used to protect the batteries from foreign matter and, also, to protect the electrical circuit of the handle 31.

The schematic diagram illustrated in the drawing FIG. 17 is self-explanatory wherein like numerals refer to like parts throughout and within.

The foregoing is considered as illustrative only to the principles of the invention. Other modifications and changes might readily occur to those skilled in the art. For example, the short rod portion 24 could move parallel to the rod 19 against a suitable spring in response to a downward pull on the line to similarly actuate the signal device. It is not desired to limit the invention to the exact construction and operation shown in the illustrations and description herein, and accordingly all suitable modifications and equivalents may be resorted to, falling within the scope of the invention as defined by the following claims.

What is claimed is:

1. A fishing rod adapted for providing a signal in response to a bite or nibble, comprising
    an elongated rod having a handle at one end and an outer end,
    first guide means arranged along the rod and at its outer end for passage of a fishing line therethrough,
    a short signal rod movably mounted on a first one box at the outer end of the elongated rod and substantially parallel thereto,
    second guide means being formed on the signal rod for passage of the line therethrough after passage through said first guide means,
    the short rod portion and the tip end of the elongated rod including electrical contacts,
    an electrical signal circuit being connected with the contacts,
    the second guide means on the signal rod and the first guide means at the tip end of the elongated rod being relatively arranged so that a bite, nibble or downward pull on the line moves the signal rod and causes the circuit to generate a signal, and
    means on a second box on the outer end of the elongated rod for adjusting the resilient response of the signal rod to force on the line.

2. The fishing rod of claim 1 further comprising fulcrum means pivotably mounting the signal rod.

3. The fishing rod of claim 1 wherein the signal circuit comprises visual and audible signal means, a power source and a switch for selectively energizing the circuit.

* * * * *